United States Patent [19]

Weck

[11] 4,135,417

[45] Jan. 23, 1979

[54] INFEED DEVICE FOR A TURNING MACHINE FOR FINISHING THE PERIPHERAL SURFACES OF ELONGATED WORKPIECES OF CYLINDRICAL CROSS-SECTION

[75] Inventor: Karl-Gustav Weck, Solingen, Fed. Rep. of Germany

[73] Assignee: Th. Kieserling & Albrecht, Solingen, Fed. Rep. of Germany

[21] Appl. No.: 854,751

[22] Filed: Nov. 25, 1977

Related U.S. Application Data

[63] Continuation-in-part of Ser. No. 703,937, Jul. 9, 1976.

[30] Foreign Application Priority Data

Jul. 12, 1975 [DE] Fed. Rep. of Germany ....... 2531320

[51] Int. Cl.² .......................... B23B 5/00; B21C 37/30
[52] U.S. Cl. .......................................... 82/20; 29/90 R
[58] Field of Search ................................. 82/20; 29/90

[56] References Cited

U.S. PATENT DOCUMENTS

| 1,082,451 | 12/1913 | Snyder | 82/20 |
| 2,655,066 | 10/1953 | Siegrist | 82/20 |
| 3,899,943 | 8/1975 | Schaller | 82/20 |
| 4,074,598 | 2/1978 | Weck | 82/20 |

FOREIGN PATENT DOCUMENTS

162038 2/1958 Norway ....................................... 29/90

*Primary Examiner*—Harrison L. Hinson
*Attorney, Agent, or Firm*—Michael J. Striker

[57] ABSTRACT

An infeed device for a turning machine for finishing the peripheral surfaces of elongated workpieces of circular cross-section includes at least one pair of inlet rolls in which the plane of symmetry of each roll normal to the axis thereof includes a small angle with the direction of movement of the workpieces through the machine, with the planes of symmetry of the two rolls of the pair inclined in opposite directions with respect to the direction of movement of the workpiece.

12 Claims, 9 Drawing Figures

INFEED DEVICE FOR A TURNING MACHINE FOR FINISHING THE PERIPHERAL SURFACES OF ELONGATED WORKPIECES OF CYLINDRICAL CROSS-SECTION

CROSS-REFERENCE TO RELATED APPLICATION

The present application is a continuation-in-part application of the copending application Ser. No. 703,937, filed July 9, 1976.

BACKGROUND OF THE INVENTION

The present invention relates to an infeed device for a turning or peeling machine for finishing the peripheral surfaces of elongated workpieces of circular cross-section, such as rods, wires and tubes, in which the turning machine is provided with a rotating cutter head and in which the infeed device includes at least one pair of inlet or infeed rolls.

In such machines it can be observed that the workpieces which are turned or peeled in the machine leave the latter in slightly curved form, bent along a large arc. This fact is of no importance if the workpieces are subsequently straightened in a straightening machine arranged aligned with downstream and adjacent the peeling machine. If, however, the curved workpiece has to be adjusted in some form, there appear often irregularities which require an adjustment by hand or special complicated apparatus.

SUMMARY OF THE INVENTION

It is an object of the present invention to provide in a turning machine of the aforementioned kind an infeed device constructed in such a manner so that the workpieces leaving the machine have a form which is easily adjustable.

With these and other objects in view, which will become apparent as the description proceeds, the present invention relates to a turning machine with a rotating cutter head for finishing the peripheral surface of elongated workpieces of circular cross-section, such as rods, wires and tubes, movable in longitudinal direction through the machine while the cutter head revolves in a predetermined direction about the axis of a workpiece, in which the turning machine is provided with an infeed device comprising at least one pair of inlet rolls, each having a plane of symmetry normal to the axis thereof, and in which the plane of symmetry of each roll of a pair is inclined through a small angle relative to the direction of movement of the workpiece through the machine, with the planes of symmetry of the rolls of at least one pair of rolls inclined in opposite directions with respect to the direction of movement of the workpiece. This construction will assure that the workpiece during its axial movement through the machine will carry out a slight turning about its longitudinal axis, whereby the finished workpiece will obtain a helical shape. The axes of the inlet rolls include respectively with the longitudinal axis of the workpiece an angle of less than 90°. The axes of the superimposed rolls of one pair of rolls include in a top view an angle with each other and this angle is twice the angle included between the plane of symmetry of each roll of the pair with the longitudinal axis of the workpiece. Since the twist imparted to the workpiece, due to the inclined position of the inlet rolls, will remain within the range of elastically deforming of the workpiece material, the present invention can also be used in finishing the outer surface of a wire taken from a coil.

According to a further feature of the present invention, the inclination of the axis of symmetry of the rolls is such that the workpieces engaged by the rolls are turned about the longitudinal axes thereof in the same direction as the cutter head rotates. This will assure that the drift imparted to the workpieces by the rotating cutter head is increased by the drift imparted to the workpiece by the inlet rolls so that the sum of the two drifts can never be zero. The turning movement of the workpieces during their machining and the substantial cork-screw shape of the finished workpiece is thus assured.

If a plurality of pairs of inlet rolls are provided, then the angle included between the plane of symmetry of each roll with the longitudinal axis of the workpiece is the same for the rolls in each pair of rolls, but this angle preferably increases in successive roll pairs toward the cutter head of the turning machine. This feature aims to divide the torsional moment imparted to the workpiece by the rotating cutter head substantially equal onto the plurality of roll pairs.

The angle which the plane of symmetry of each roll includes with the longitudinal axis is to be greater than zero but smaller than 10°, which will assure a sufficient helical shape of the finished workpiece, without unduly limiting the maximum cutting speed at which the cutting head may be operated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
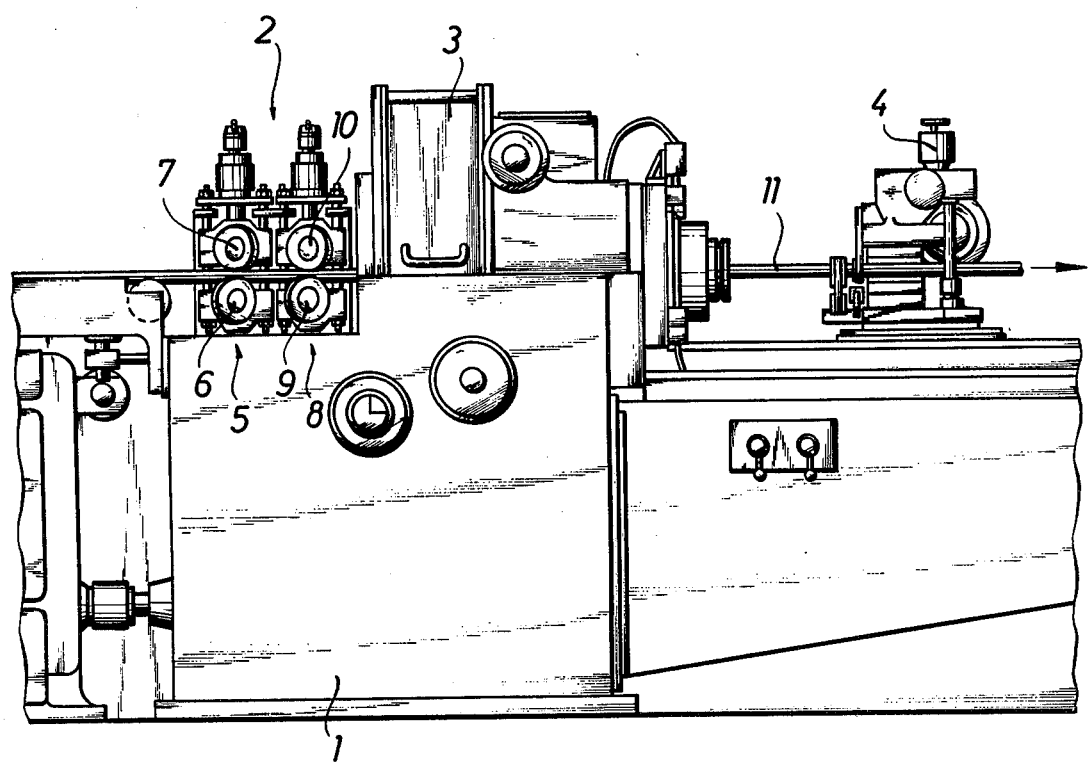
FIG. 1 is a side view of a bar turning or peeling machine provided with an infeed device according to the present invention.
Figure 2:
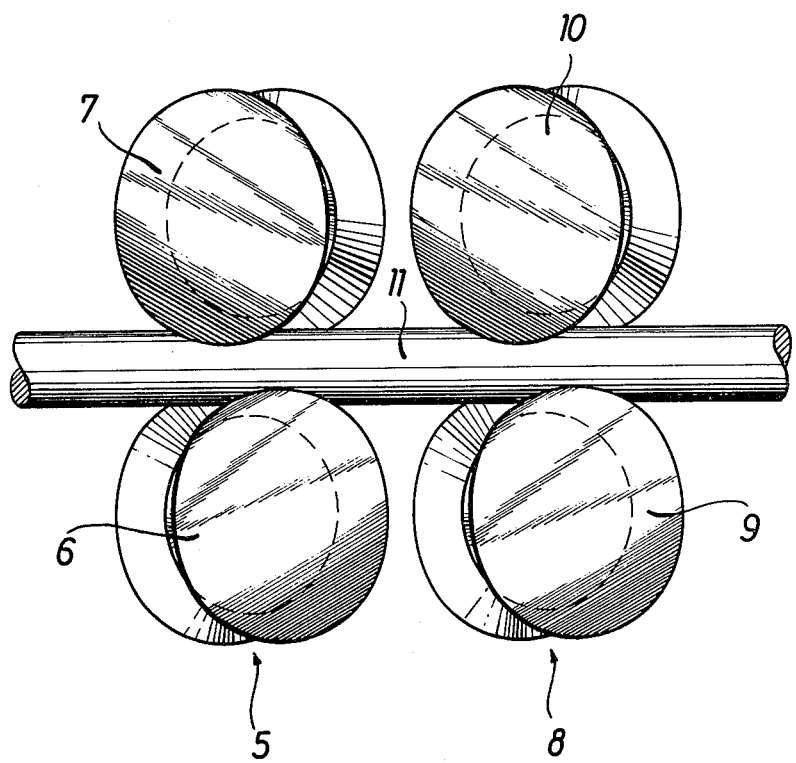
FIG. 2 is a schematic side view of rolls of the infeed device with a workpiece engaged by the rolls.
Figure 3:
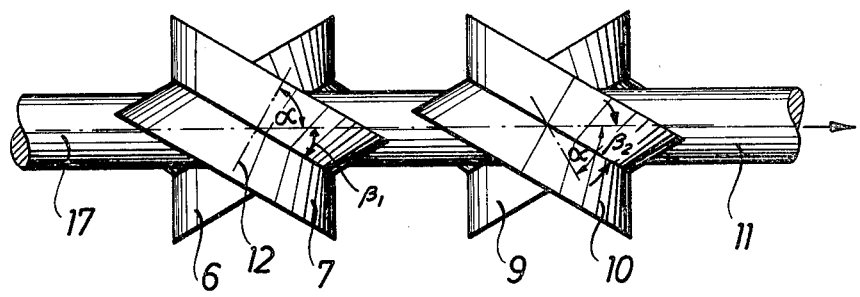
FIG. 3 is a top view of FIG. 2.

FIG. 1 illustrates in side view a bar turning or peeling machine 1, with an infeed device 2 according to the present invention, and a housing 3 for a rotating cutter head, which will be described later on in connection with FIG. 6. A withdrawal carriage 4 is provided downstream of the housing 3 for moving the workpiece 11 in longitudinal direction through the machine, or for supporting the movement of the workpiece imparted thereto by the infeed device 2, when the rolls of the latter are driven. The infeed device 2 has two pairs of cooperating rolls 5 and 8. The rolls 6 and 7 of the roll pair 5 as well as the rolls 9 and 10 of the roll pair 8 are synchronously adjustable in radial direction with respect to the workpiece, so that workpieces of different diameters may be properly engaged by the rolls. The infeed device 2 holds each workpiece in substantial alignment with a central opening provided in the cutter head. As shown in FIGS. 2 and 3, the rolls 6 and 7 of the roll pair as well as the rolls 9 and 10 of the roll pair 8 are inclined with respect to the longitudinal axis of the workpiece 11. The roll axes 12 include with the longitudinal axes of the workpiece 11 an angle $\alpha$ (FIG. 3) of less than 90°. The roll axes are, similar as the axes of rolls in a two-roll straightening machine, inclined to the workpiece axis. The axes of the rolls in each pair are inclined in opposite directions, but through the same angle with regard to the workpiece axis. The rolls shown in FIGS. 1-4 and 6 have a V-shaped profile to properly centralize the workpiece with respect to the rolls.

The angle $\beta$ included between the plane of symmetry of each roll and the longitudinal workpiece axis 17 is greater than zero but smaller than 10°, and preferably about 3°. The angle $\beta 1$ of the roll pair 5, which is spaced further from the cutting head in the housing 3, is preferably smaller than the angle $\beta 2$ of the roll pair 8 in order to distribute the moment imparted to the workpiece cutter head substantially equal to the two roll pairs.

The phenomenon of the bent workpieces can be explained that at the contact points 13–16 (FIG. 4) between the rolls and the workpiece such a strong pressure will occur that the adjacent regions of the workpieces will be hardened. Since during operation a slight offset between the center line of the workpiece and the center line of the cutter head is unavoidable, these hardened or compressed strips are unsymmetrically relieved so that the remaining tensions are not rectified and lead to the abovementioned curvature of the workpiece. If the inlet rolls are, according to the present invention, inclined with respect to the workpiece axis there will result a finished workpiece 11a of helical shape, shown in exaggerated manner in FIG. 5, since the hardened strips of material turn in form of a helix about the workpiece axis.

Figure 6:
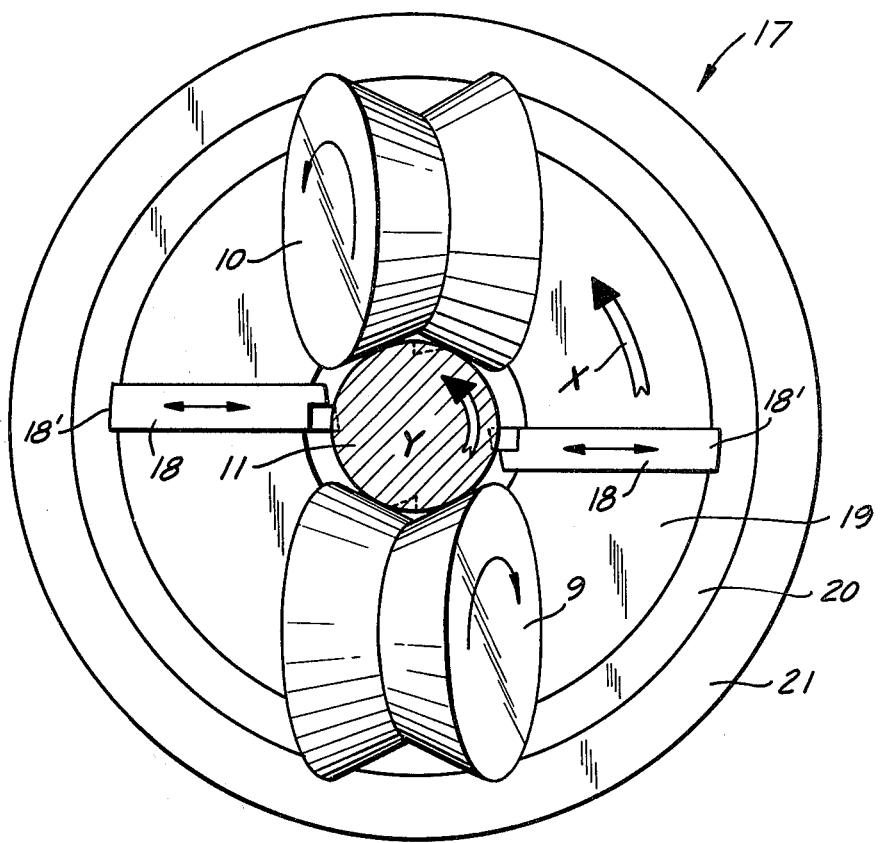
FIG. 6 is a schematic end view of the cutter head and showing also the rotation of the latter with respect to the rotation of the inlet rolls and the workpiece engaged thereby.

The cutter head 17, schematically illustrated in FIG. 6, comprises an internal substantially cylindrical member 19 provided with at least two substantially diametrically opposite arranged grooves in which cutting knives 18 are located, adjustable in the direction as shown by the double-headed arrows toward and away from the periphery of the workpiece 11 to be machined, which passes in longitudinal direction through a central opening of the member 19. The member 19 is surrounded by a bushing 20 having an internal conical surface engaging correspondingly shaped outer surfaces 18' of the cutting knives, and the bushing 20 is movable in axial direction relative to the member 19, by means well known in the art and not shown in the drawing, so as to adjust the radial position of the cutting knives 18. The bushing 20 is surrounded by a hollow shaft 21 which is driven about its axis by means not shown in the drawing. The central member 19, the bushing 20 and the follow shaft 21 are connected by key means, not shown in the drawing, for simultaneous rotation in the direction of the arrow X, and it is to be understood that the key means connecting the members 19 and 20 with each other are constructed in such a manner that the member 19 may be shifted axially of the member 20. FIG. 6 shows also the inlet rolls 9 and 10 adjacent to the cutter head and the direction of rotation thereof so that the workpiece 11 is rotated as indicated by the arrow Y during feeding thereof in longitudinal direction.

Figure 4:
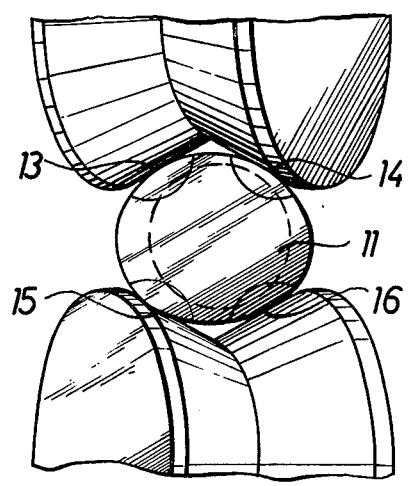
FIG. 4 illustrates a cross-section of a workpiece engaged between two inclined rolls, whereby for reason of clarity the section is not hatched.
Figure 5:
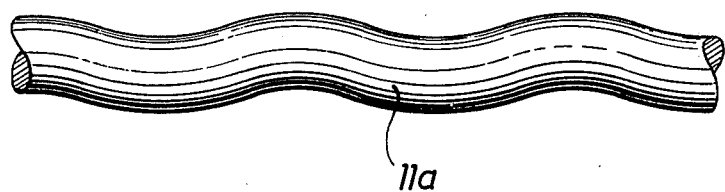
FIG. 5 is a side view of a finished workpiece in which the curvature imparted thereto is shown in an exaggerated manner.
Figure 7:
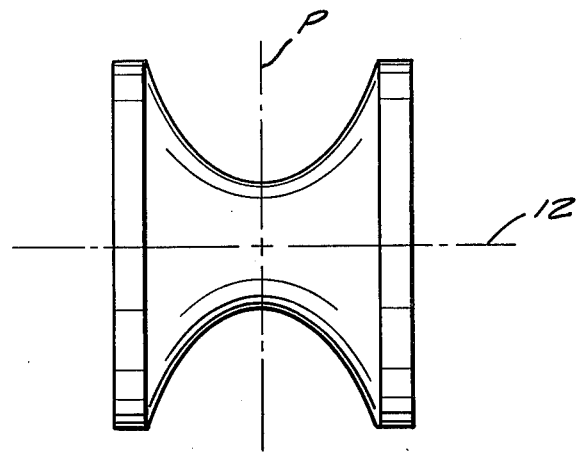
FIGS. 7-9 are front views of various modifications of profiled rolls for the infeed device.
Figure 8:
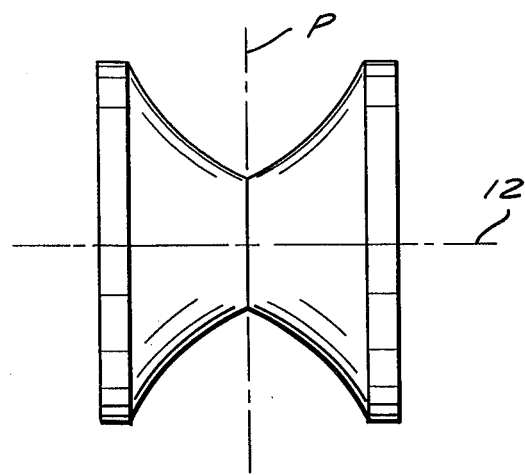
Figure 9:
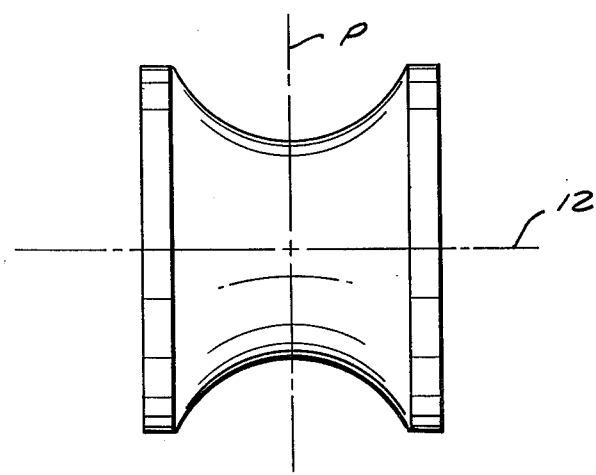

The grooved rolls of the infeed device of the present invention may have different profiles. Thus while the rolls shown in FIGS. 2-4 have each a groove of V-shaped profiles with straight flanks, the roll shown in FIG. 7 has a groove in the form of a hyperbola with steep flanks. The roll shown in FIG. 8 has a groove similar to that shown in FIGS. 2-4, in which, however, the flanks are concavely curved, whereas the roll shown in FIG. 8 has a groove defined by a circular sector. Common to all groove profiles is, that the rolls in their position of use, in which the plane of symmetry P of each roll normal to the axis 12 thereof includes with the direction of movement of the workpiece an angle greater than zero and smaller than 10°, will engage the work only at two opposite points as indicated in FIG. 4, and not at the plane of symmetry. In other words, the radius of the roll profile in the region of the plane of symmetry thereof has to be smaller than the minimum radius of the workpiece to be machined. In the embodiment shown in FIGS. 2-4 as well as in the embodiment shown in FIG. 8, the radius of curvature of the roll profile in the plane of symmetry is substantially zero.

It will be understood that each of the elements described above, or two or more together, may also find a useful application in other types of infeed devices for a turning machine for finishing the peripheral surfaces of elongated workpieces of cylindrical cross-section, differing from the types described above.

While the invention has been illustrated and described as embodied in an infeed device for a turning machine for finishing the peripheral surfaces of elongated workpieces of cylindrical cross-section, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a turning machine with a cutter head for finishing the peripheral surface of elongated workpieces of circular cross-section, such as rods, wires and tubes, movable in longitudinal direction through the machine while the cutter head revolves in a predetermined direction about the axis of a workpiece, an infeed device comprising at least one pair of inlet rolls, at least one of said at least one pair of inlet rolls being a grooved roll, each of said inlet rolls having a plane of symmetry normal to the axis thereof, the plane of symmetry of each roll of a pair being inclined through an angle relative to the direction of movement of the workpiece which is greater than zero and smaller than 10°, with the plane of symmetry of the rolls in said at least one pair of rolls inclined in opposite directions with respect to the direction of movement of the workpiece.

2. An infeed device as defined in claim 1, wherein the profile of each grooved roll is such so as to engage the workpiece only at two substantially opposite small surface portions.

3. An infeed device as defined in claim 1, wherein the radius of curvature of each grooved roll in the region of said plane of symmetry and in any cross-section including the axis thereof is smaller than the minimum radius of the workpiece to be machined.

4. An infeed device as defined in claim 1, wherein each of said grooved rolls has a V-shaped profile with straight flanks.

5. An infeed device as defined in claim 1, wherein each of said grooved rolls has a V-shaped profile with curved flanks.

6. An infeed device as defined in claim 5, wherein said flanks are concavely curved.

7. An infeed device as defined in claim 3, wherein each of said grooved rolls has a hyperbolic profile.

8. An infeed device as defined in claim 3, wherein each of said grooved rolls has a profile in form of a sector of a circle.

9. An infeed device as defined in claim 1, wherein the magnitude of the angle included between the plane of symmetry and the direction of movement of the workpiece is the same for both rolls of said at least one pair of rolls.

10. An infeed device as defined in claim 1, wherein the planes of symmetry of the rolls of said at least one pair of rolls are inclined to the direction of movement of a workpiece in such a manner that the workpiece passing between the rolls is turned in said predetermined direction about its axis.

11. An infeed device as defined in claim 1, wherein both rolls of said at least one pair of inlet rolls are grooved inlet rolls.

12. An infeed device as defined in claim 1, wherein said infeed device includes a plurality of pairs of inlet rolls spaced from each other in said direction of movement of the workpiece, wherein the magnitude of the angle included between the plane of symmetry and said direction is the same for both rolls of each pair, with the magnitude of the angle in successive pairs increasing toward the cutter head.

* * * * *